United States Patent [19]

Unger et al.

[11] 4,107,984

[45] Aug. 22, 1978

[54] SYSTEM FOR MAINTAINING LEVEL OF OIL IN ENGINE

[75] Inventors: Ronald James Unger, Richmond; John Gilbert Spoonamore, Hagerstown, both of Ind.

[73] Assignee: Dana Corporation, Toledo, Ohio

[21] Appl. No.: 786,632

[22] Filed: Apr. 11, 1977

[51] Int. Cl.² .......................................... G01M 15/00
[52] U.S. Cl. .................................................. 73/113
[58] Field of Search .................. 73/113, 117.3, 116; 184/103 R; 123/196 S

[56] References Cited

U.S. PATENT DOCUMENTS

| | | | |
|---|---|---|---|
| 2,669,869 | 2/1954 | Weber | 73/113 |
| 3,448,609 | 6/1969 | Sibeud | 73/113 |
| 3,908,450 | 9/1975 | Schreiber | 73/113 |

Primary Examiner—Anthony V. Ciarlante
Attorney, Agent, or Firm—William J. Clemens

[57] ABSTRACT

A fluid flow system for delivering a fluid selectively from a supply tank and a scavenge tank to an internal combustion engine. The system includes pumping means for normally supplying the fluid from the supply tank to the engine and valve means for closing the output of the supply tank upon the presence of any fluid within the scavenge tank such that the pumping means supplies the fluid from the scavenge tank to the engine.

9 Claims, 4 Drawing Figures

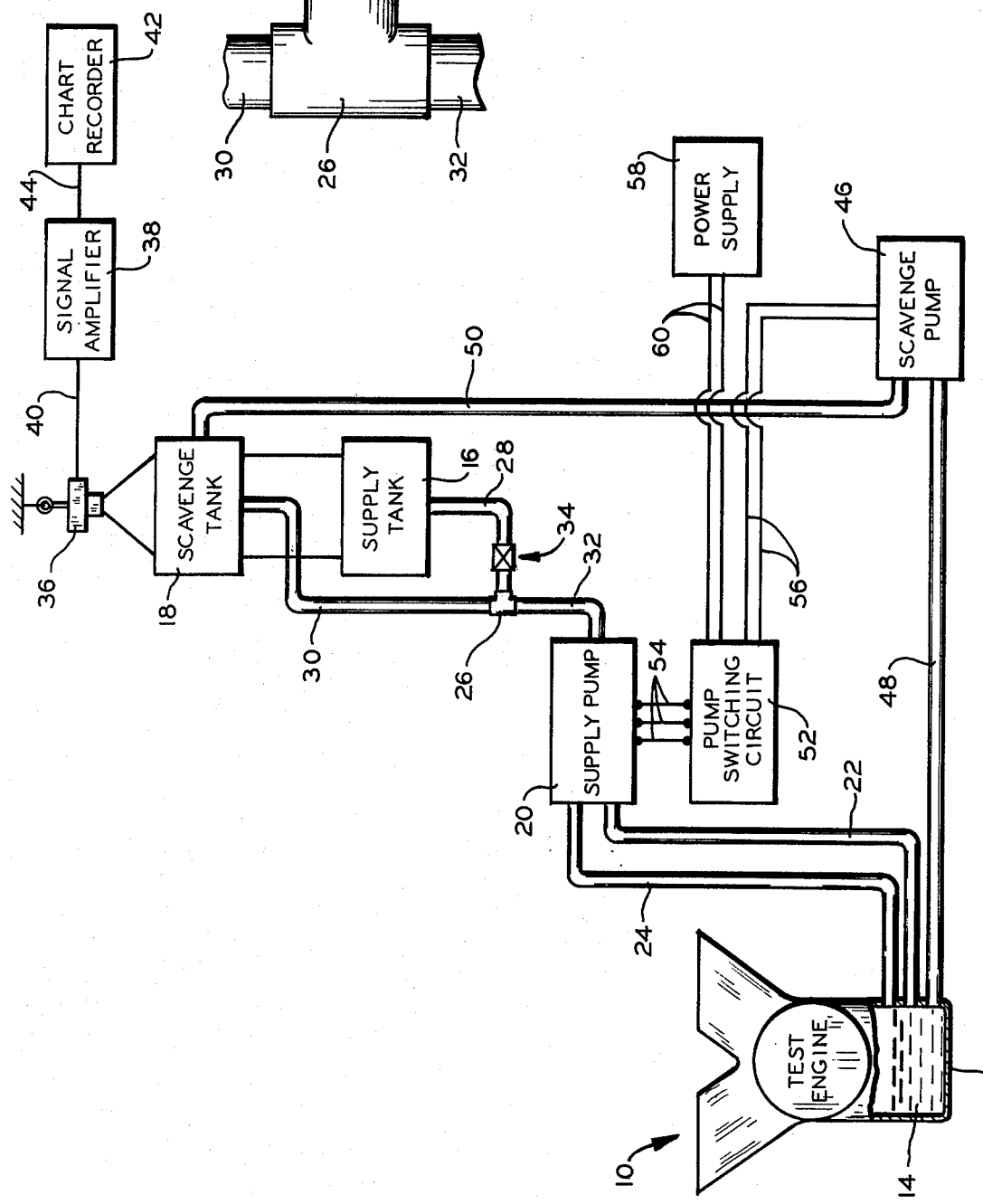

SYSTEM FOR MAINTAINING LEVEL OF OIL IN ENGINE

BACKGROUND OF THE INVENTION

In the testing of engines and particularly internal combustion engines such as gasoline burning and diesel engines, it is often desirable to ascertain information concerning the consumption of engine lubricating oils. By ascertaining such information, much knowledge can be gained regarding the events occuring within the engine during the operation thereof. The functions which are in part determined by oil consumption include the efficiency of the piston rings, valve operation and overall engine efficiency. The previous system for maintaining the desired oil level in a test engine and measuring the rate of oil consumption circulated the oil between the engine and the tank of fresh oil and weighed the oil mechanically on a balance scale. At the beginning of a test, considerable time was required to stabilize the oil from an unsettled condition brought about by an elevation in temperature, dilution of the oil by fuel, and contamination before being able to obtain accurate oil consumption data.

Also, at the conclusion of a test, the used oil was often discarded after all critical measurements were made.

SUMMARY OF THE INVENTION

The present invention provides a system which continuously monitors the amount of oil consumed by an internal combustion engine and minimizes the contamination of the oil during the testing operation by separately recycling the used oil until additional fresh oil is required.

The objectives and advantages of the invention can readily be achieved in a system for delivering a lubricating fluid to an internal combustion engine including a first fluid supply tank, a second fluid supply tank, a first pump for supplying fluid to the engine selectively from the first and second tanks when the fluid in the engine is below a predetermined level, valve means blocking the flow of fluid from the first tank upon the presence of fluid in the second tank, and a second pump for delivering fluid from the engine to the second tank when the fluid in the engine is above a predetermined level.

BRIEF DESCRIPTION OF THE DRAWINGS

Other objects and advantages of the invention will become readily apparent to one skilled in the art from reading the following detailed description of an embodiment of the invention when considered in the light of the accompanying drawings in which:

FIG. 1 is a diagrammatic view of a system embodying the principles of the invention;

FIG. 2 is an enlarged fragmentary view partially in section showing a fluid flow blocking mechanism of the system illustrated in FIG. 1;

DETAILED DESCRIPTION OF A PREFERRED EMBODIMENT OF THE INVENTION

Figure 3:
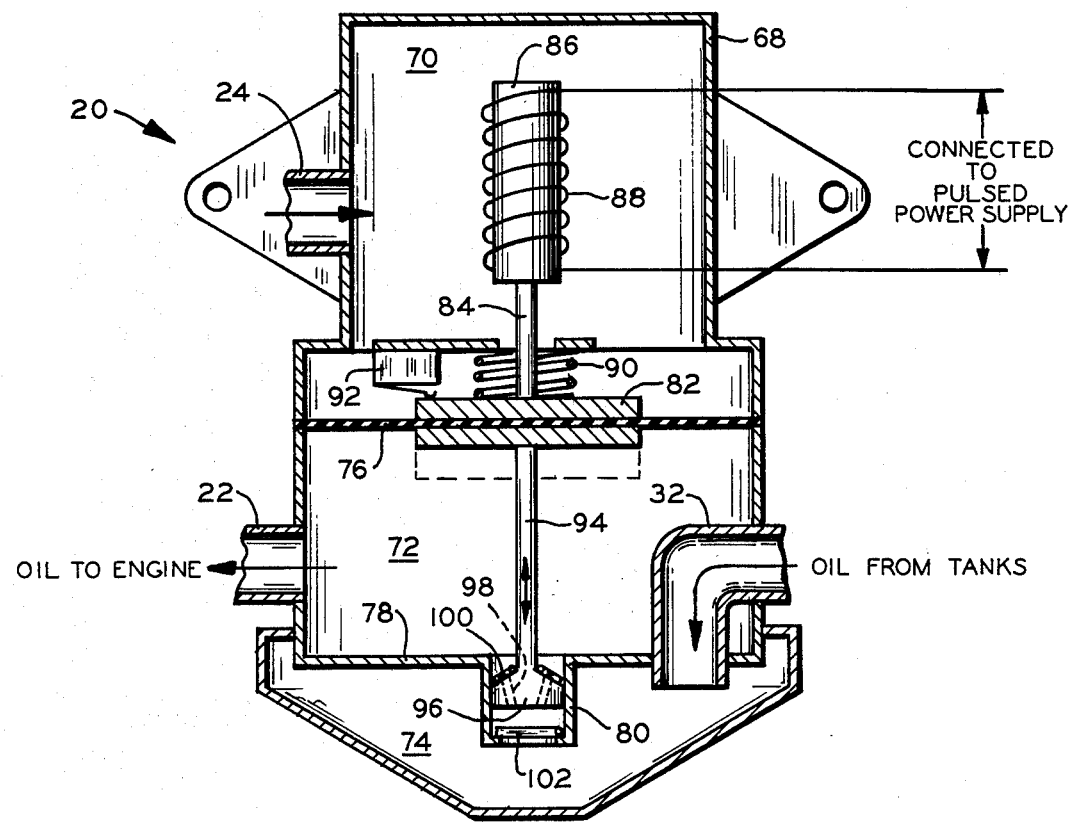
FIG. 3 is a diagrammatic illustration of a supply regulator pump of the system illustrated in FIG. 1.

Referring to FIG. 1 there is shown in system embodying the main features of the invention wherein there is a test engine generally indicated by reference numeral 10 having a crank-case 12 containing lubricating oil therein up to the level 14. A lubricating oil delivery or supply system for supplying oil to the test engine 10 is provided and includes a fresh oil supply tank 16, a scavenge tank 18, and a supply regulator pump 20. The outlet of the pump 20 is coupled to the engine crankcase 12 through a suitable conduit 22. A vent tube 24 is coupled between the pump 20 and a sensing probe disposed within the crankcase 12 of the engine 10. The outlet of the supply tank 16 and the scavenge tank 18 are coupled to a Tee joint 26 through conduits 28 and 30, respectively. The other branch of the Tee joint 26 is coupled to the inlet of the pump 20 through a conduit 32. A one way pressure sensing valve 34 is positioned in the conduit 28 leading from the supply tank 16 to the Tee joint 26. The valve 34 is illustrated in some detail in FIG. 2 and will be explained in more detail hereinafter.

The supply tank 16 and the scavenge tank 18 are suspended from a load cell 36 in any suitable manner so that the gross weight of the tanks and their respective contents may be continuously monitored. The output of the load cell is electrically coupled to a signal amplifier 38 through an electrical conductor 40. The output of the signal amplifier 38 is fed to a chart recorder 42 through an electrical conductor 44.

A scavenge pump 46 has its inlet coupled to the crankcase 12 of the engine 10 through a conduit 48 and its outlet to the scavenge tank 18 through a conduit 50.

The pump operation of the supply tank 20 controls and the scavenge pump 46 is controlled by a pump switching circuit 52. The switching circuit 52 is electrically coupled to the supply pump 20 and the scavenge pump 46 through electrical conductor means 54 and 56 respectively. Electrical power is delivered to the system from a d.c. power supply 58 through electrical conductors 60.

During the operation of the system thus far described, it is an objective to maintain a predetermined level of lubricating oil 14 in the crankcase 12 of the engine 10. Normally, the pump 20 supplies the lubricating oil from the supply tank 16. However, when the end of the supply line 22 terminating within the crankcase 12 is covered by oil, the supply pump 20 thereby senses an oil level above the predetermined level 14 at this point and signals the pump switching circuit 52 to energize the scavenge pump 46. Upon energization, the scavenge pump 46 pumps oil from the crankcase 12 and delivers the same to the scavenge tank 18. The pump 46 continues pumping until the liquid level in the crankcase 12 returns to the desired level 14 at which time the supply pump 20 senses the condition and will commence its pumping operation and, simultaneously, the switching circuit 52 will cut off the power to the scavenge pump 46 stopping any further emptying of the oil from the crankcase 12.

At this stage in the operation, used oil has been pumped into the scavenge tank 18 creating a pressure head within the outlet conduit 30. The pressure head established in the conduit 30 is established due to the fact the scavenge tank 18 is located physically at a level above the level of the supply tank 16 and the head is sufficient to cause the valve 34 to close preventing the flow of fluid from the tank 16. While it is understood that a number of check valve structures could be utilized in the conduit 28 to check the flow of fluid from the supply tank 16 upon the presence of a fluid content in the scavenge tank 18, the valve 34 shown in FIG. 2 functions quite satisfactorily. More specifically, the valve 34 includes a main body portion 62 having an integral hollow septum 64 extending transversely thereof which and effectively functions as a seat for a swingable flap member 66. Accordingly, the check valve 34 is designed to allow fluid to pass through only in the direction of the arrow in FIG. 2, thereby permitting fluid to pass from the supply tank 16. Any pressure head built-up in the opposite direction from fluid in the scavenge tank, will effectively immediately cause the flap 66 to seat against the septum 64 closing the valve 34 and preventing any further flow of fluid from the tank 16.

With a supply of oil scavenged from the crankcase 12 in the scavenge tank 18, any time that the engine 10 calls for more lubricating oil, the oil in the scavenge tank 18 will be consumed before any fresh oil is allowed to flow to the engine. It will be understood that one of the typical circumstances under which the engine 10 will require more oil is when the speed of the engine is increased.

The specific operation of the supply tank 20, the scavenge pump 46 and the switching circuit 52 will be completely understood from consideration of the material illustrated in FIGS. 3 and 4 and the attendant description set forth hereinafter. However, before proceeding with the specific description it will be understood that the weight of the lubricating oil consumed by the test engine 10 can be determined by the decrease in the total combined weight of the supply tank 16, the scavenge tank 18, and their respective contents. Such total weight decrease is continuously sensed and recorded by the load cell 36 to which the assemblage of elements is suspended. The output of the load cell 36 is in the form of an electrical signal which is typically fed to the signal amplifier 38 through the conductor 40. The amplified signal, which is a function of weight loss, is fed to the chart recorder 42 through the conductor 44. The chart recorder 42 effectively maintains a visible record of the amount of weight loss occuring during the test of the engine 10.

Now turning to the description of the structure and operation of the regulator supply pump 20 which is diagramatically illustrated in FIG. 3, there is a main housing 68 divided into three separate chambers 70, 72 and 74. The chamber 70 is defined by the outer shells of the housing 68 and a rubber diaphragm 76 which extends completely across the housing. The chamber 72 is defined by the outer shell of the housing 68, the rubber diaphragm 76, and an interior wall 78 having a pump cylinder 80 depending therefrom. The chamber 74 is defined by the bottom wall of the housing 68 and the interior wall 78.

The chamber 70 communicates with the crankcase 12 above the level 14 of the lubricating oil through the conduit 24. A piston member 82 mounted to the rubber diaphragm 76 is disposed within the chamber 70 and has an upwardly extending piston rod 84 and armature 86 adapted for movement within an associated solenoid coil 88. The coil 88 is connected at opposite ends to a power supply (not shown) which generates current pulses. Spring means 90 normally bias the piston 82 to the most downwardly position illustrated in dashed lines in FIG. 3. A microswitch 92 is disposed within the chamber 70 and has an arm which is contacted by the piston 82 during the operation of the pump 20. Since the connections between the pump 20 and the conduits 22 and 24 are located above the connections between the crankcase 12 and the conduits, the chambers 70 and 72 are at the crankcase pressure when the oil is at the level 14.

When a current pulse is applied to the coil 88, the armature 86 is drawn into the coil thereby causing the piston 82 to contact the arm of the microswitch 92 and compress the springs 90. In the time between current pulses, the springs 90 push the piston 82 to the dashed lines position and out of contact with the arm of the microswitch. When the end of the supply conduit 22 is covered with oil, backpressure or pressure above the crankcase pressure is generated in the chamber 72. The combined backpressure and the force generated by the energized coil 88 is sufficient to oppose the pressure generated by the springs 90 such that the piston 82 does not move from the position shown in FIG. 3.

Within the chamber 72, there is a piston rod 94 which depends downwardly from the piston 82 and contains a smaller piston 96 operative to reciprocate within the cylinder 80. The piston 96 contains several passageways 98 extending from bottom to the top thereof. At the upper terminals of the passageways 98 is a check valve 100. Also, communication between the interior of the cylinder 80 and the interior of the bottom chamber 74 is achieved through a check valve 102. The chamber 72 communicates with the crankcase 12 of the engine 10 through the conduit 22, while the chamber 74 communicates with the source of lubrication oil through the conduit 32.

During the pumping from the supply tank 16, oil flows through the conduit 32 to maintain the chamber 74 in a filled condition and under the pressure head established by the oil in the supply tank. Each time the armature is drawn into the coil 88, the pistons 82 and 96 are drawn upwardly. The movement of the piston 96 upwardly decreases the volume of the pump cylinder 80 above the piston 96 thereby raising the level of the oil in the chamber 72 and forcing it into the conduit 22 where it flows to the crankcase 12 of the engine 10. During the upward stroke of the piston 96, the check valves 100 are forced closed to prevent the oil in the chamber 72 from flowing into the passageways 98 in the piston 96. At the same time, the volume of the pump cylinder 80 below the piston 96 increases allowing oil to flow through the check valve 102 into the cylinder 80 from the chamber 74.

Each time the armature 86 is drawn from the coil 88 by the action of the springs 90 on the piston 82, the piston 96 is forced downwardly. The oil which was drawn into the lower portion of the cylinder 80 is now forced through the passageways 98 and the check valves 100 as the check valve 102 is forced closed. This oil replaces the oil which had been forced from the chamber 72 on the upward stroke of the piston 96. Thus, as the coil 88 is pulsed, the armature 86, the piston 82 and the piston 96 are reciprocated to alternately force oil from the chamber 72 into the conduit 22 and draw oil into the chamber 72 from the chamber 74.

When the fluid level exceeds the level 14, the lower end of the supply tube 22 is covered and the spring means 90 must work against the backpressure as well as the solenoid coil force. As was previously discussed, these forces prevent the movement of the armature 86 even though the coil 88 is still being pulsed. The pump will resume normal pumping only when the oil level in the crankcase 12 is lowered to the level 14.

Figure 4:
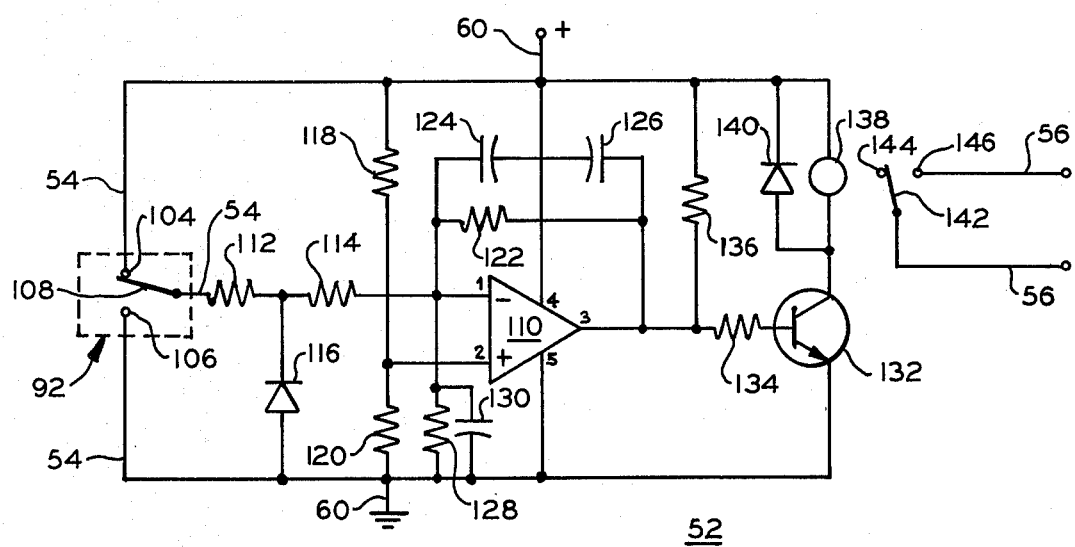
FIG. 4 is a circuit diagram of the pump switching circuit of the system illustrated in FIG. 1.

There is shown in FIG. 4 a schematic diagram of the pump switching circuit 52. The microswitch 92 of FIG. 3 is shown schematically as a single pole, double throw switch having a first contact 104 connected to the positive potential side of the power supply 58 (not shown) by one of the electrical conductors 60. A second contact 106 is connected to the ground potential side of the power supply by the other one of the electrical conductors 60. When the microswitch 92 is actuated, a finger 108 is positioned at the first contact 104 and is connected to an inverting input 110-1 of an operational amplifier 110 through a pair of series connected resistors 112 and 114. A diode 116 has a cathode connected to the junction of the resistors 112 and 114 and an anode connected to the ground potential conductor 60. The amplifier 110 also has a noninverting input 110-2 connected to the junction of a pair of resistors 118 and 120 connected in series between the positive potential and ground potential conductors 60. The amplifier 110 has an output 110-3 connected to the input 110-1 through a resistor 122 connected in parallel with a pair of series connected capacitors 124 and 126. The input 110-1 is also connected to the ground potential conductor 60 through a resistor 128 and a capacitor 130 connected in parallel.

The amplifier 110 has a positive power supply input 110-3 connected to the positive potential conductor 60 and a negative power supply input 110-5 connected to the ground potential conductor 60. When the magnitude of the voltage at the input 110-2 exceeds the magnitude of the voltage at the input 110-1, the voltage at the power input 110-4 is connected to the output 110-3. When the magnitude of the voltage at the input 110-1 exceeds the magnitude of the voltage at the input 110-2, the voltage at the power input 110-5 is connected to the output 110-3.

When the arm of the microswitch 92 is not actuated by the piston 82, the finger 108 is at the contact 106. Thus, the input 110-1 is alternately connected to the positive potential and the ground potential as the pump 20 pumps oil from the supply line 32. The resistor 128 and the capacitor 130 function as a filter to smooth the alternating voltage and generate a triangular wave form on an average d.c. signal level at the input 110-1. The diode 116 shorts to ground potential any negative voltage spikes generated by the operation of the microswitch 92. The resistors 118 and 120 function as a voltage divider to generate a reference voltage at the input 110-2. The peaks of the triangular wave form exceed the reference voltage to generate the ground potential at the output 110-3 and the valleys drop below the reference voltage to generate the positive potential. The values of the input resistors 112 and 114 and the feedback resistor 122 determine the d.c. gain of the amplifier 110. The capacitors 124 and 126 function to integrate the input signal and to filter the signal at the output 110-3 so that the output signal makes a smooth transition when the signal level at the input 110-1 exceeds the reference voltage at the input 110-2.

The output 110-3 is connected to a base of an NPN transistor 132 through a resistor 134 and is connected to the positive potential conductor 60 through a resistor 136. A collector of the transistor 132 is also connected to the positive potential conductor 60 through a relay coil 138. A diode 140 has an anode connected to the collector of the transistor 132 and a cathode connected to the positive potential conductor 60. The switch portion of the relay has a finger 142 which is normally positioned at a contact 144 and is moved to a contact 146 when the coil 138 is energized. The finger 142 and the contact 146 are connected to the electrical conductor means 56 for switching on the scavenge pump 46.

The predetermined voltage generated by the amplifier 110 biases the transistor 132 in a turned off state to prevent current flow through the relay coil 138. When the pump 20 stops due to an overfill condition in the crankcase 12, the input 110-1 will be grounded. The capacitors 124 and 126 will discharge and the amplifier will generate the positive potential at the output 110-3. Since the amplifier 110 is a low current device, the major current flow to the base of the transistor 132 is through the resistor 136 to bias the transistor in a turned on state. Current will flow through the relay coil 138 to actuate the switch and position the finger at the contact 146 to turn on the scavenge pump 46 of FIG. 1.

When the oil level drops to the level 14, the pump 20 will turn on again to operate the microswitch 92. The amplifier 110 again generates the predetermined voltage to turn off the transistor 132. The diode 140 provides a discharge path for the current generated by the collapse of the field of the coil 138. The switch finger 142 returns to the contact 144 to turn off the scavenge pump 46. The relay is "fail safe" in that a loss of power to the switching circuit 52 causes the finger 142 to return to the contact 144 and turn off the scavenge pump.

In summary, the present invention concerns a system for delivering a lubricating fluid to an internal combustion engine, typically an engine under test wherein the rate of oil consumption is to be measured. The system comprises a first fluid supply tank, a second fluid supply tank, a first pump for supplying fluid to the engine selectively from the first and second tanks when the fluid in the engine is below a predetermined level, valve means blocking the flow of fluid from the first tank upon the presence of fluid in the second tank and a second pump for delivering fluid from the engine to the second tank when the fluid in the engine is above the predetermined level. The first pump has a first inlet in fluid communication with the first and second fluid supply tanks, a second inlet in fluid communication with the engine above the predetermined level, an outlet in fluid communication with the engine at the predetermined level and means responsive to the presence of crankcase pressure at the outlet for pumping fluid from the first inlet to the output and responsive to the presence of backpressure at the outlet for terminating the pumping. The second pump has an inlet in fluid communication with the engine below the predetermined fluid level and an outlet in fluid communication with the second tank. The valve means has an inlet in fluid communication with the first tank, an outlet in fluid communication with the second tank and the first pump and means responsive to the presence of fluid in the first tank for allowing fluid flow from the inlet to the outlet through the valve means and responsive to the presence of fluid in the second tank for blocking the fluid flow.

The system also includes a switching circuit responsive to a fluid pumping signal for turning on the second pump when the fluid pumping signal is absent. The signal is generated by means in the first pump when the first pump is pumping fluid to the engine. The switching circuit includes a source of a reference signal, means responsive to the difference between the reference and the fluid pumping signal for generating a control signal and means responsive to the control signal for controlling the operation of the second pump.

In accordance with the provisions of the patent statutes, the principle and mode of operation of the invention have been explained and illustrated in its preferred embodiment. However, it must be understood that the invention may be practiced otherwise than as specifically illustrated and described without departing from its spirit or scope.

What is claimed is:

1. A system for delivering a lubricating fluid to an internal combustion engine comprising:
   a first fluid supply tank;
   a second fluid supply tank;
   a first pump for supplying fluid to the engine selectively from said first and second tanks when the fluid in the engine is below a predetermined level;
   valve means blocking the flow of fluid from said first tank upon the presence of fluid in said second tank; and
   a second pump for delivering fluid from the engine to said second tank when the fluid in the engine is above the predetermined level.

2. A system according to claim 1 wherein said first pump has a first inlet in fluid communication with said first and second fluid supply tanks, a second inlet in fluid communication with the engine above the predetermined level, an outlet in fluid communication with the engine at the predetermined level, and means responsive to the presence of crankcase pressure at said outlet for pumping fluid from said first inlet to said outlet and responsive to the presence of backpressure at said outlet for terminating said pumping.

3. A system according to claim 1 wherein said valve means has an inlet in fluid communication with said first tank, an outlet in fluid communication with said second tank and said first pump and means responsive to the presence of fluid in said first tank for allowing fluid flow from said inlet to said outlet through said valve means and responsive to the presence of fluid in said second tank for blocking said fluid flow.

4. A system according to claim 1 wherein said valve means includes a main body portion having an integral hollow septum extending transversely thereof between said inlet and said outlet; wherein said means responsive to the presence of fluid in said second tank is a swingable flap member attached to and seating against said septum; and wherein said second tank is located above said first tank such that fluid in said second tank produces a higher pressure on said flap member than the fluid in said first tank to seat said flap member against said septum to block the flow of fluid from said first tank.

5. A system according to claim 1 wherein said first pumping means includes means for generating a signal when said first pumping means is pumping fluid to the engine and wherein said system includes a switching circuit responsive to said fluid pumping signal for turning on said second pump when said fluid pumping signal is absent.

6. A system according to claim 5 wherein said switching circuit includes a source of a reference signal, means responsive to the difference between said reference signal and said fluid pumping signal for generating a control signal and means responsive to said control signal for controlling the operation of said second pump.

7. A system according to claim 6 wherein said difference responsive means is an operational amplifier having said reference signal applied to one input and said fluid pumping signal applied to the other input for generating said control signal at an output.

8. A system for delivering a lubricating fluid to an internal combustion engine under test comprising:
   a first fluid supply tank;
   a second fluid supply tank;
   a load cell, said first and second tank suspended from said load cell with said second tank positioned above said first tank, said load cell generating a signal representing the weight of the fluid in said tanks;
   a first pump having a first inlet in fluid communication with said first and second tanks, a second inlet in fluid communication with the engine above a predetermined fluid level and an outlet in fluid communication with the engine at the predetermined fluid level, said first pump for supplying fluid to the engine from said tanks when the fluid in the engine is below the predetermined level;
   valve means blocking the flow of fluid from the first tank upon the presence of fluid in said second tank;
   a second pump for delivering fluid from the engine to said second tank when the fluid in the engine is above the predetermined level; and
   means responsive to said load cell signal for determining the rate of consumption of the fluid.

9. A system according to claim 8 wherein said second pump has an inlet in fluid communication with the engine below the predetermined fluid level and an outlet in fluid communication with said second tank.

* * * * *

UNITED STATES PATENT AND TRADEMARK OFFICE
CERTIFICATE OF CORRECTION

PATENT NO. : 4,107,984

DATED : August 22, 1978

INVENTOR(S) : RONALD J. UNGER and JOHN G. SPOONAMORE

It is certified that error appears in the above-identified patent and that said Letters Patent are hereby corrected as shown below:

Column 2, line 29   Change "supply tank 20" to -- supply pump 20 --.

Column 3, line 21   Change "supply tank 20" to -- supply pump 20 --.

Claim 4, line 1     Change "to claim 1" to -- to claim 3 --.

Signed and Sealed this

Fifth Day of June 1979

[SEAL]

Attest:

RUTH C. MASON
*Attesting Officer*

DONALD W. BANNER
*Commissioner of Patents and Trademarks*